(12) United States Patent
Angetter et al.

(10) Patent No.: US 11,192,766 B2
(45) Date of Patent: Dec. 7, 2021

(54) QUICK-CHANGE COUPLING FOR A CONTAINER TREATMENT MACHINE

(71) Applicant: KRONES AG, Neutraubling (DE)

(72) Inventors: Tobias Angetter, Neutraubling (DE); Monika Fuhrmann, Neutraubling (DE)

(73) Assignee: KRONES AG, Neutraubling (DE)

( * ) Notice: Subject to any disclaimer, the term of this patent is extended or adjusted under 35 U.S.C. 154(b) by 251 days.

(21) Appl. No.: 16/304,513

(22) PCT Filed: Jul. 19, 2017

(86) PCT No.: PCT/EP2017/068202
§ 371 (c)(1),
(2) Date: Nov. 26, 2018

(87) PCT Pub. No.: WO2018/072900
PCT Pub. Date: Apr. 26, 2018

(65) Prior Publication Data
US 2019/0300352 A1 Oct. 3, 2019

(30) Foreign Application Priority Data

Oct. 19, 2016 (DE) ...................... 10 2016 220 472.6

(51) Int. Cl.
*B67B 3/20* (2006.01)
*B67C 3/26* (2006.01)
(Continued)

(52) U.S. Cl.
CPC .............. *B67B 3/2066* (2013.01); *B67B 3/20* (2013.01); *B67C 3/26* (2013.01); *F16D 1/112* (2013.01);
(Continued)

(58) Field of Classification Search
CPC ....... B67B 2201/10; B67B 3/116; B67B 3/20; F16D 1/116; F16D 1/112; B67C 3/26; B67C 2003/2668
(Continued)

(56) References Cited

U.S. PATENT DOCUMENTS 3,822,951 A 7/1974 Bornzin
3,906,706 A * 9/1975 Conti .................... B67B 3/2066
53/331.5
(Continued)

FOREIGN PATENT DOCUMENTS

CN 101432088 A 5/2009
CN 105889362 A 8/2016
(Continued)

OTHER PUBLICATIONS

Spring Latch With Tube and Plunger, on sale by Zoro, on webiste: https://www.zoro.com/buyers-products-spring-latch-wtube-and-plunger-3ulu6/i/G4118563/#specifications (Year: 2016).*
(Continued)

*Primary Examiner* — Anna K Kinsaul
*Assistant Examiner* — Himchan Song
(74) *Attorney, Agent, or Firm* — McCoy Russell LLP

(57) ABSTRACT

A quick-change coupling is described for a container treatment machine, in particular a capping machine, with an outer member and an inner member engaging therewith in a positive-fit manner, between which members torques in a working direction of rotation and axial forces can be transmitted. Due to the fact that the outer member and the inner member are connectable to each other by pushing one into the other and twisting, a simple connection/separation of the quick-change coupling is possible without tools, as well as reliable and play-free transmission of unidirectional torques and contact pressure forces.

19 Claims, 4 Drawing Sheets

(51) Int. Cl.
*F16D 1/112* (2006.01)
*F16D 1/116* (2006.01)

(52) U.S. Cl.
CPC .......... *F16D 1/116* (2013.01); *B67B 2201/10* (2013.01); *B67C 2003/2668* (2013.01)

(58) Field of Classification Search
USPC ...................................... 269/53–54.5; 53/329
See application file for complete search history.

(56) References Cited

U.S. PATENT DOCUMENTS

| | | | | |
|---|---|---|---|---|
| 5,884,450 | A * | 3/1999 | Ronchi | ............ B67B 3/00 53/281 |
| 8,166,730 | B2 | 5/2012 | Schmatz | |
| 8,631,630 | B2 * | 1/2014 | Naaber | ............ B67B 3/2033 53/329 |
| 2001/0054273 | A1 * | 12/2001 | Gruson | ............ B67B 3/2066 53/331.5 |
| 2004/0237471 | A1 | 12/2004 | Hidding et al. | |
| 2007/0084151 | A1 * | 4/2007 | Brown | ............ B67B 3/2066 53/490 |
| 2009/0179368 | A1 * | 7/2009 | Haimer | ............ B23B 31/1071 269/54.2 |
| 2010/0205905 | A1 * | 8/2010 | Schmatz | ............ B67B 3/2066 53/317 |

FOREIGN PATENT DOCUMENTS

| | | |
|---|---|---|
| DE | 2321544 A1 | 11/1973 |
| DE | 102007028429 A1 | 12/2008 |
| DE | 202013005502 U1 | 8/2013 |
| EP | 0850872 A1 | 7/1998 |
| EP | 3034457 A1 | 6/2016 |
| WO | 2008154973 A2 | 12/2008 |

OTHER PUBLICATIONS

State Intellectual Property Office of the People's Republic of China, Office Action and Search Report Issued in Application No. 201780038543.4, dated Mar. 19, 2020, 19 pages. (Submitted with Partial Translation).

ISA European Patent Office, International Search Report Issued in Application No. PCT/EP2017/068202, dated Nov. 8, 2017, WIPO, 4 pages.

State Intellectual Property Office of the People's Republic of China, Office Action and Search Report Issued in Application No. 201780038543.4, dated Nov. 6, 2020, 9 pages. (Submitted with Partial Translation).

* cited by examiner

QUICK-CHANGE COUPLING FOR A CONTAINER TREATMENT MACHINE

CROSS-REFERENCE TO RELATED APPLICATIONS

The present application is a U.S. National Phase of International Patent Application Serial No. PCT/EP2017/068202 entitled "QUICK-CHANGE COUPLING FOR A CONTAINER TREATMENT MACHINE," filed on Jul. 19, 2017. International Patent Application Serial No. PCT/EP2017/068202 claims priority to German Patent Application No. 10 2016 220 472.6 filed on Oct. 19, 2016. The entire contents of each of the above-referenced applications are hereby incorporated by reference for all purposes.

TECHNICAL FIELD

The invention relates to a quick-change coupling for a container treatment machine.

BACKGROUND AND SUMMARY

Quick-change couplings on container treatment machines are used, for example, to releasably connect without tools permanently mounted drive shafts and/or lifting rods to exchangeable holders for container components or the like. For example, capping machines transfer unidirectional torques as well as axial pressure forces when mounting screw caps. The corresponding parts of the quick-change coupling must therefore during operation be connected both in a rotationally fixed and an axially fixed manner.

For this purpose, DE 10 2007 028 429 A1 discloses a capping machine in which a dovetail connection is formed between an upper drive member of the capping chucks and a lower tool holder such that the tool holder can be pulled or pushed laterally out of the drive member. In addition, engagement mechanisms with springs or the like are provided to lock the drive member and the tool holder in a position that is coaxial with respect to a common axis of rotation.

Disadvantageous in the above quick-change coupling are the relatively sharp-edged undercuts of the dovetail connection and exposed springs for the locking connection. Firstly, cleaning the associated capping chuck is made more difficult. Secondly, the springs can detach from their seats so that the tool holder is no longer reliably locked during working operation and may possibly even detach. Furthermore, space for the lateral removal is necessary when changing the tool holder, for which additional installation space is to be provided at the machine.

There is therefore a demand for a quick-change coupling that allows unidirectional torque transmission and axial force transmission at container treatment machines while providing ease of handling during the exchange and/or ease of cleaning and/or safe operation.

The object posed is satisfied with a quick-change coupling. According thereto, the latter is configured for a container treatment machine, in particular a capping machine. The quick-change coupling is a detachable connection of an outer member with and an inner member engaging therein in a positive-fit manner, between which torques can be transmitted in a working direction of rotation as well as axial forces, in particular, contact pressing forces. According to the invention, the outer member and the inner member are connectable to each other by pushing one into the other and twisting, where the outer member comprises locking pins resiliently preloaded inwardly, and where the inner member comprises first guide bevels for the locking pins for forcing the locking pins outwardly when one is pushed into the other, and engagement recesses into which the locking pins can engage both in a rotationally fixed and axially fixed manner during the subsequent twisting motion of the outer member and the inner member relative to each other in the working direction of rotation.

The locking pins are then seated in the engagement recesses without play in the working direction of rotation and without axial play. The locking pins can also be referred to as locking bolts. They are guided in an inwardly/outwardly movable manner in associated channels, in particular bores.

Engagement "during"/"when" twisting the outer member and the inner member relative to one another is to be understood as meaning that the locking pins directly at the end of the twisting motion engage inwardly, preferably in the radial direction, in the engagement recesses due to spring tension. In contrast to conventional bayonet couplings/locks, there is therefore no separate axial motion of the outer and inner members relative to one another between the twisting motion and the locking action. In addition to unidirectional torque transmission, a substantially play-free transmission of axial pressure forces is also made possible without the risk of unintentional release of the coupling connection existing.

Pushing the inner member into the outer member when connecting the quick-change coupling takes place substantially axially, as well as separating the quick-change coupling by pulling the outer member and the inner member apart. Consequently, lateral access and/or space for laterally removing the inner member from the outer member is unnecessary.

When the locking pins are engaged, the engagement recesses and the locking pins are then configured such that the outer member and the inner member are fixedly coupled to each other both in the working direction of rotation and in a working stroke direction. In particular, torques as well as contact pressure forces can be transmitted substantially free of play by way of the quick-change coupling.

The guide bevels are configured as bevels that are partially circumferentially offset from one another in the sense of grooves that are formed running at an increasing radial spacing relative to the axis of rotation, i.e. obliquely outwardly. The guide cross-section of the guide bevels for the locking pins need not be even in the sense of a bevel running circumferentially along an edge, but instead can be, for example, concave or otherwise configured to match the locking pins.

A relative motion of the locking pins in the guide bevels when one is pushed into the other causes the locking pins to be increasingly pressed into the outer member. For this purpose, the locking pins are preloaded, preferably by use of compression springs or at least an otherwise resilient bearing and/or guided radially in the outer member.

Formed at the engagement recesses are preferably second guide bevels for the locking pins for forcing the locking pins outwardly during the twisting motion in the direction opposite to the working direction of rotation and to guide them out from the engagement recesses. The locking pins are then increasingly pressed into the outer member. This allows for easy separation of the quick-change coupling by twisting back and then pulling apart the inner member and the outer member without any additional manual unlocking and with little effort.

Guide grooves extending substantially circumferentially for the locking pins are preferably formed between the first and the second guide bevels. The locking pins pushed outwardly by the first guide bevel can then be guided precisely into the engagement recesses. Likewise, the locking pins pushed outwardly by the second guide bevel can be precisely guided back into the first guide bevel. The outer member and the inner member then lead each other, so that the quick-change coupling can be connected and separated with little or no visual control.

The guide grooves preferably have an axial inclination. For example, the axial inclination is formed such that the outer member and the inner member are moved axially towards each other during the twisting motion in the working direction of rotation. The outer member and the inner member can thereby be pressed against each other in order to increase the strength and/or stability of the connection.

The guide grooves additionally or alternatively have an eccentric guide surface for the locking pins with a guide radius that decreases towards the engagement recesses. As a result, the extent to which the locking pins are pressed into the outer member decreases toward the engagement recesses. This, firstly, facilitates the manually forced motion of the locking pins out from the engagement recesses and, secondly, makes a self-active separation of the quick-change coupling more difficult, since the resistance presented to the spring-loaded locking pins increases with the twisting motion in the direction opposite to the working direction of rotation, i.e., with increasing distance from the engagement recesses.

The locking pins preferably have a substantially flat and/or convexly curved face side and the guide grooves, in particular, a guide cross-section corresponding thereto. This allows for particularly precise guidance of the locking pins into the engagement recesses with low frictional resistance.

The first guide bevels preferably extend transversely, in particular orthogonally, to the working direction of rotation and obliquely outwardly in the direction away from the outer member. For example, the first guide bevels are then aligned in radial planes with respect to the axis of rotation. This facilitates pushing the inner member substantially axially into the outer member.

The locking pins, the first guide bevels and the engagement recesses are preferably formed at least three-fold in mutually corresponding circumferential distribution. This accomplishes a uniform load distribution for the transmission of torque and axial forces with relatively little production effort. A circumferentially uniform distribution, at intervals of 120°, allows for a particularly simple connection of the quick-change coupling. A circumferentially non-uniform distribution, for example, at intervals of 110, 120 and 130°, is particularly suitable for a rotationally accurate connection of the outer member and the inner member. This would also be possible with a number of locking pins, first guide bevels and engagement recesses differing therefrom, for example, in having a four-fold or five-fold configuration for every quick-change coupling.

The engagement recesses and the locking pins preferably comprise round cross-sections that fit into each other. This facilitates the guidance of the locking pins in the engagement recesses, in the guide bevels and in the guide grooves both when pushing one into the other as well as during the twisting motion and the locking/unlocking action.

The engagement recesses are preferably through-holes. This facilitates the production and cleaning of the inner member by minimizing edges and corners that are difficult to access.

For preloading the locking pins, the outer member preferably comprises compression springs associated with the former and/or an elastic ring enveloping the locking pins. The resilient mount could comprise, for example, a substantially circumferentially oriented elastic ring, in particular an O-ring, which envelops the locking pins together and presses them inwardly by way of expansion stress. For this purpose, a respective seat for the elastic ring can be formed on the outer member, preferably a circumferentially extending groove and/or at least one bracket holding the elastic ring in a partially circumferentially manner.

Furthermore, mechanical stops for the locking pins are preferably formed on the outer member and limit the locking pins in their inward extension. The locking pins and compression springs can then not drop off the outer member.

Cleaning holes are preferably formed on the outer member. This enables easy cleaning of the quick-change coupling, possibly also in a connected state.

Matching concentric mating surfaces are preferably formed on the outer member and on the inner member. This promotes a simple connection of the inner member and the outer member to each other as well as the stability of the coupling connection established.

The outer member is preferably configured as a drive connection to a shaft and/or lifting rod arranged in particular thereabove. For example, for this purpose the outer member comprises a thread, in particular an external thread, having a closing direction in the working direction of rotation. Preferably both working torque as well as axial contact pressure force are transmitted via the drive connection.

The inner member is preferably configured as an exchangeable holder for a tool insert and/or a container component, in particular as a holder for a cap insert and/or a screw cap. The inner member can then be exchanged without tools in the event of a format change, for example, when using a different type of cap, while the outer member is permanently mounted on the associated treatment machine.

In principle, the inner member could also be used as a drive connection and the outer member as an exchangeable holder for a tool insert or a container component.

The object posed is also satisfied with a capping chuck which is suitable for mounting screw caps to containers and comprises a quick-change coupling according to at least one of the preceding embodiments. The capping chuck then preferably transmits both torque unidirectionally as well as contact pressure force when mounting the screw caps. Furthermore, the capping chuck transmits axial contact pressure force to receive the screw caps in an associated cap insert in order to force the screw caps into the capping inserts.

BRIEF DESCRIPTION OF THE FIGURES

The object posed is also satisfied with a container capping machine comprising a continuously rotatable container carousel and several capping chucks revolving thereon as above.

A preferred embodiment of the invention is illustrated in the drawings, where.

DETAILED DESCRIPTION

Figure 1:
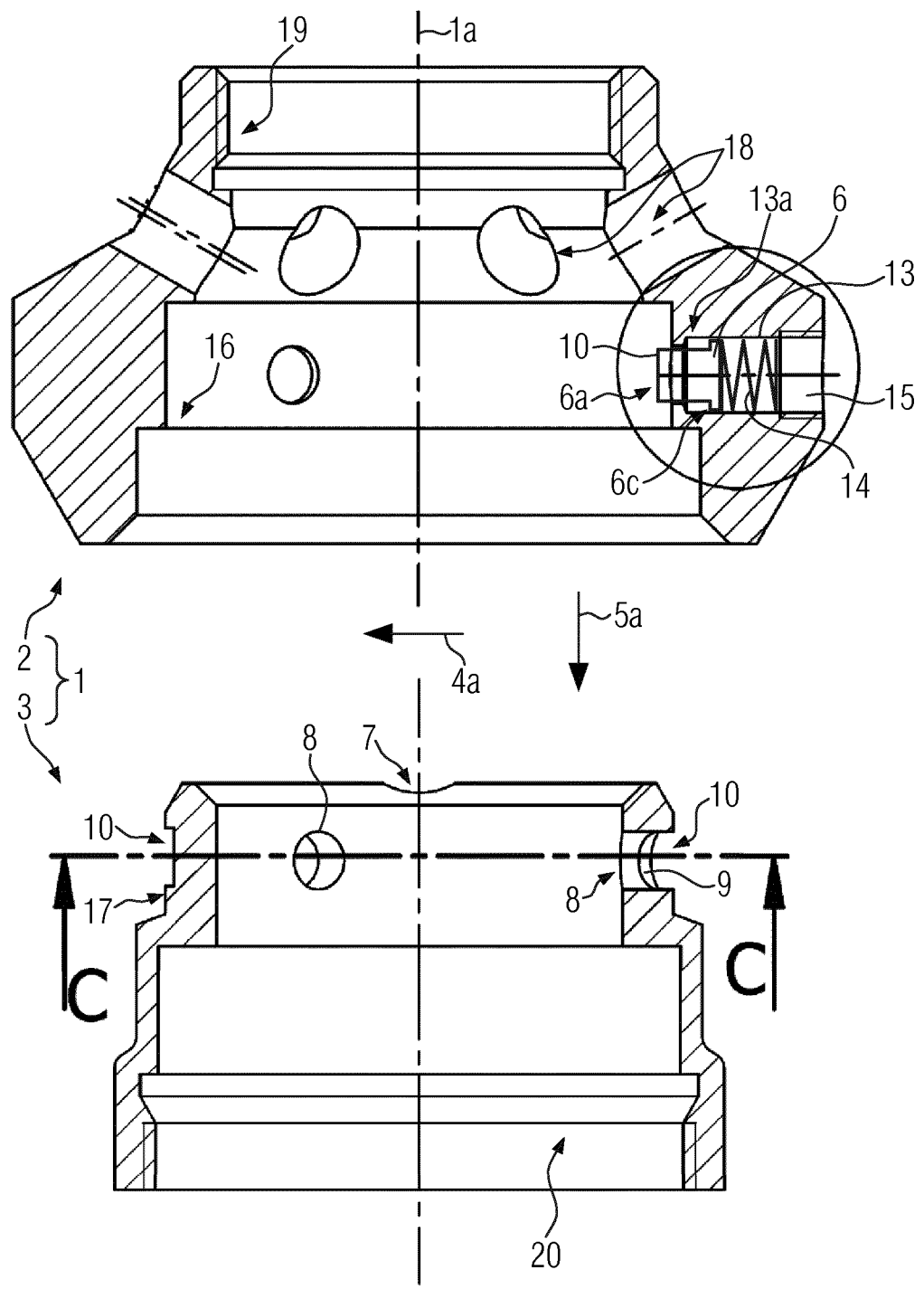
FIG. 1 shows a longitudinal sectional view through the quick-change coupling.
Figure 5:
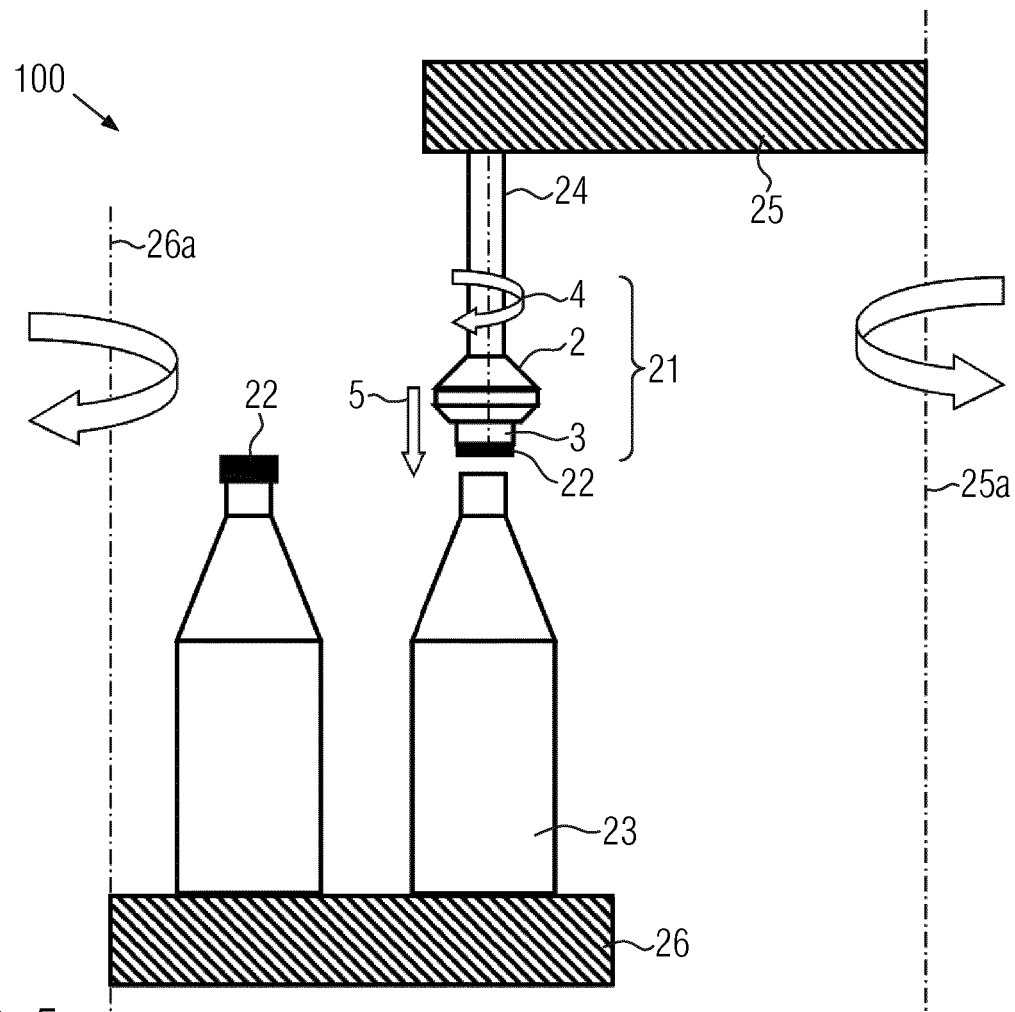
FIG. 5 shows a schematic lateral view of a treatment machine for containers.

As can be seen in particular in FIGS. 1 and 5 in longitudinal section view, quick-change coupling 1 for container treatment machines 100, such as capping machines, comprises an outer member 2 and an inner member 3 engaging therein in a positive-fit manner. Torques 4 between the outer member 2 and the inner member 3 can be transmitted in a working direction of rotation 4a and axial forces 5 in particular in a working stroke direction 5a.

Outer member 2 and inner member 3 can be fixedly connected to each other by axially pushing one into the other and by twisting in the working direction of rotation 4a about a common axis of rotation 1a. For this purpose, locking pins 6 preloaded resiliently inwardly are preferably mounted radially displaceable on outer member 2.

Figure 2:
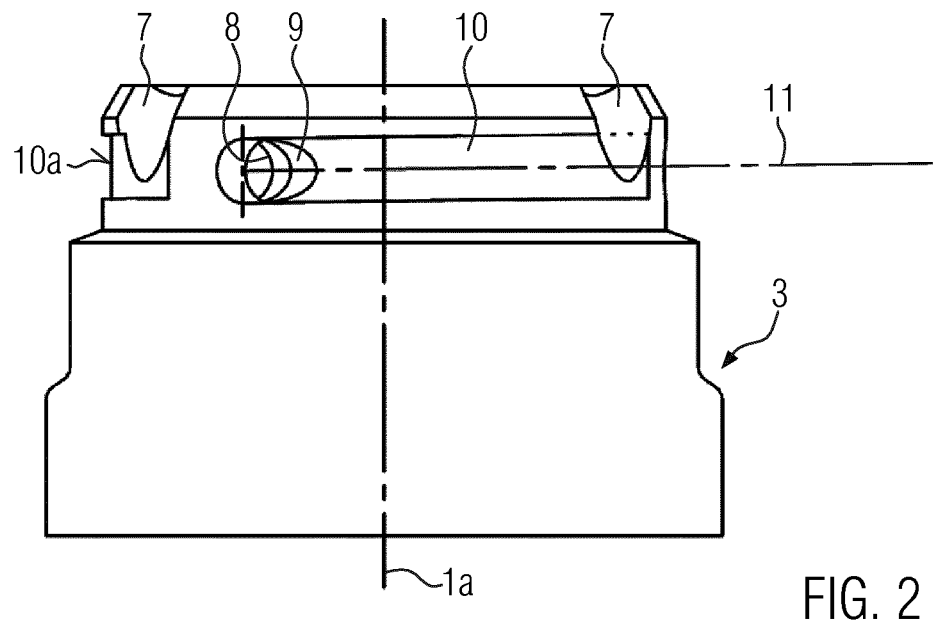
FIG. 2 shows a lateral view of the inner member of the quick-change coupling.

At least 3 first outer guide bevels 7 are formed on the inner member matching the distribution and shaping of locking pins 6. They extend transversely, in particular orthogonally, to working direction of rotation 4a and obliquely outwardly in the direction away from outer member 2. As can be seen, for example, in FIG. 2, first guide bevels 7 are used for threading locking pins 6 on inner member 3 under a preload which preferably increases continuously when pushing one into the other.

Formed on inner member 3 are furthermore engagement recesses 8 for locking pins 6, for example, in the form of substantially round through-holes. Formed at engagement recesses 8 are preferably second outer guide bevels 9 with a ramp inclination 9a schematically indicated in FIG. 3 for again guiding engaged locking pins 6 during the manual twisting action in a direction opposite to working direction of rotation 4a out from engagement recesses 8.

First and second guide bevels 7, 9 are connected to each other by substantially circumferentially extending guide grooves 10 for locking pins 6. This allows for simple production of structures on outer member 2 and inner member 3 engaging with each other in a positive-fit manner. However, first and second guide bevels 7, 9 could also have a more complex, in particular curved extension, and merge directly with one another, so as to effect mutual guidance of outer member 2 and inner member 3 when pushing one into the other and twisting. Likewise, second guide bevels 9 could in principle be replaced or supplemented by functionally equivalent chamfers, bevels or the like on locking pins 6.

Guide grooves 10 can have an axial inclination 11. In particular, axial inclination 11 is formed such that outer member 2 and inner member 3 are moved axially towards each other during the twisting action in working direction of rotation 4a. Outer member 2 and inner member 3 can thereby also be pressed against each other when quick-change coupling 1 is connected.

Guide grooves 10 can additionally or alternatively comprise eccentric guide surfaces 10a for locking pins 6 with a guide radius 12 decreasing with respect to axis of rotation 1a from first guide bevels 7 to associated engagement recesses 8. As a result, the preload decreases at locking pins 6 when twisting in working direction of rotation 4a, i.e. toward engagement recesses 8.

This, firstly, facilitates forced guidance of locking pins 6 out from engagement recesses 8 during the manual separation of quick-change coupling 1 in a direction opposite to working direction of rotation 4a and, secondly, prevents unintentional separation of unloaded quick-change coupling 1. In other words, eccentric guide surfaces 10a promote a relative motion of locking pins 6 in working direction of rotation 4a and prevent twisting in the opposite direction being too easy or occurring in a self-active manner.

Figure 3:
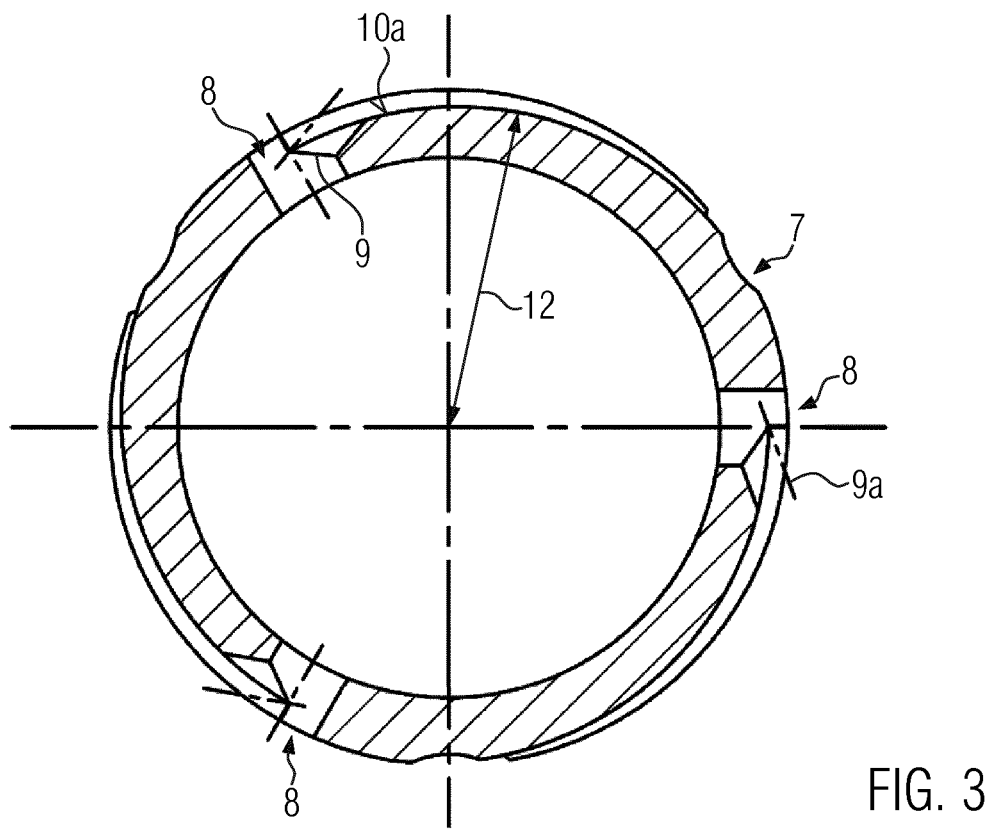
FIG. 3 shows a cross-section of the inner member along the section line C-C of FIG. 1.

As can be seen in particular in FIG. 3, locking pins 6, guide bevels 7, 9 and engagement recesses 8 are preferably each formed three-fold at equal angular distances from each other of respectively 120°. This allows for uniform load distribution and simple manual connection of outer member 2 and inner member 3, optionally also without visual inspection. However, a number of connection elements for every quick-change coupling 1 differing therefrom would also be conceivable as well as unequal angular distances (not shown) to allow pushing one into the other only at a certain relative rotational position of outer member 2 and inner member 3.

Figure 4:
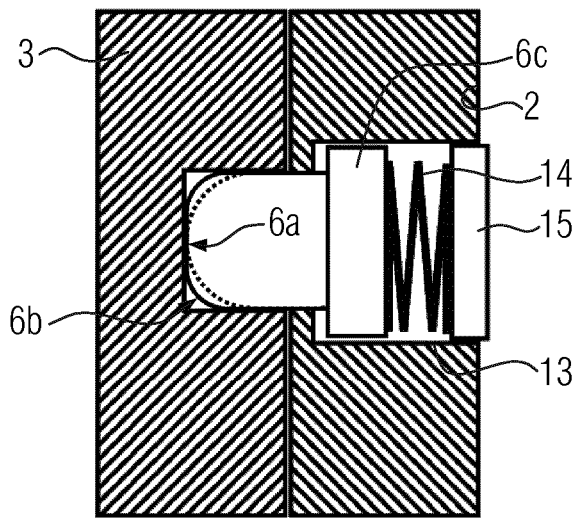
FIG. 4 shows a schematic cross-section of a locking pin and a guide groove.

Locking pins 6 comprise, for example, planar face sides 6a which can slide along guide surfaces 10a. For this purpose, face sides 6a can also have circumferential bevels 6b and/or be formed to be convex (indicated schematically by dashed lines in FIG. 4).

Guide surface 10a then preferably comprises a cross-section corresponding to face side 6a in such a way that locking pins 6 are guided therein along axial inclinations 11 and/or eccentric guide radii 12.

Locking pins 6 are guided in outer member 2 in preferably radial bores 13 or similar channels and preloaded resiliently inwardly, for example, by way of compression springs 14. As a result, locking pins 6 always run in guide bevels 7, 9 and in guide groove 10 when connecting/separating quick-change coupling 1.

Bores 13 comprise cross-sectional constrictions located radially inwardly as stops 13a for heads 6c located radially outwardly and formed on locking pins 6. For example, grub screws 15A are used as an abutment for compression springs 14 or functionally corresponding resilient elements. Together with stops 13a and heads 6c, they prevent locking pins 6 and compression springs 14 from dropping out. In their place or in addition thereto, a resilient compressible cushion made of rubber, silicone, foam or other elastic material could be arranged for each locking pin 6 in/on associated bore 13 to generate the preload.

The preferably round cross-sections of engagement recesses 8 and locking pins 6 fit to each other in such a manner that locking pins 6 engage in a self-acting manner in engagement recesses 8 due to the preload and inner member 3 is fixedly coupled to outer member 2 both in working direction of rotation 4a and in working stroke direction 5a when locking pins 6 are engaged. As schematically indicated by FIG. 5, torques 4 as well as axial forces 5, in particular contact pressure forces, can therefore be transmitted between outer member 2 and inner member 3 by way of quick-change coupling 1 substantially without play, in particular from outer member 2 to the inner member 3.

Concentric mating surfaces 16, 17 are preferably formed on outer member 2 and on inner member 3 and abut each other when quick-change coupling 1 is connected and establish a coaxial arrangement of outer member 2 and inner member 3 with respect to axis of rotation 1a. This also facilitates precise and smooth guidance of locking pins 6 on inner member 3.

Cleaning holes 18 are preferably formed on outer member 2 for cleaning quick-change coupling 1, furthermore, a drive connection 19, for example, in the form of an internal thread.

Inner member 3 preferably comprises a holding region 20 for a tool, a container component or the like. For example, a cap insert for receiving and screwing on screw caps can there be inserted.

FIG. 5 illustrates the use of quick-change coupling 1 at a container treatment machine 100 which is configured, for example, as a capping machine with several capping chucks 21 (only one of which is shown) for mounting screw caps 22 to containers 23. Capping chucks 21 include lifting/rotating shafts 24 known per se for transmitting torque 4 and axial force 5 when screwing screw caps 22 on and there revolve continuously on a carousel 25 about an axis of rotation 25a.

Containers 23 revolve synchronously thereto, for example, at a further carousel 26, about axis of rotation 26a in a known manner. In the region of the point of contact of the associated partial circles, screw caps 22 are placed on containers 23 and screwed thereonto. For this purpose, screw caps 22 are held in a torque-resistant manner by a cap insert 27 (see FIG. 6) seated in a positive-fit manner in holding region 20. Such cap inserts 27 can be produced in a simple manner and adapted to specific container formats or cap formats.

For changing a format, inner member 3 of quick-change coupling 1 with cap insert 27 seated therein can be separated without tools from outer member 2 by first twisting inner member 3 in a direction opposite to working direction of rotation 4a and then withdrawing it downwardly. Consequently, access to capping chuck 21 can there take place from below. Any lateral access requiring space, however, is unnecessary. Quick-change coupling 1 is also easy to clean.

Quick-change coupling 1 further enables reliable and play-free transmission of unidirectional torques 4 and axial contact pressure forces 5.

Figure 6:
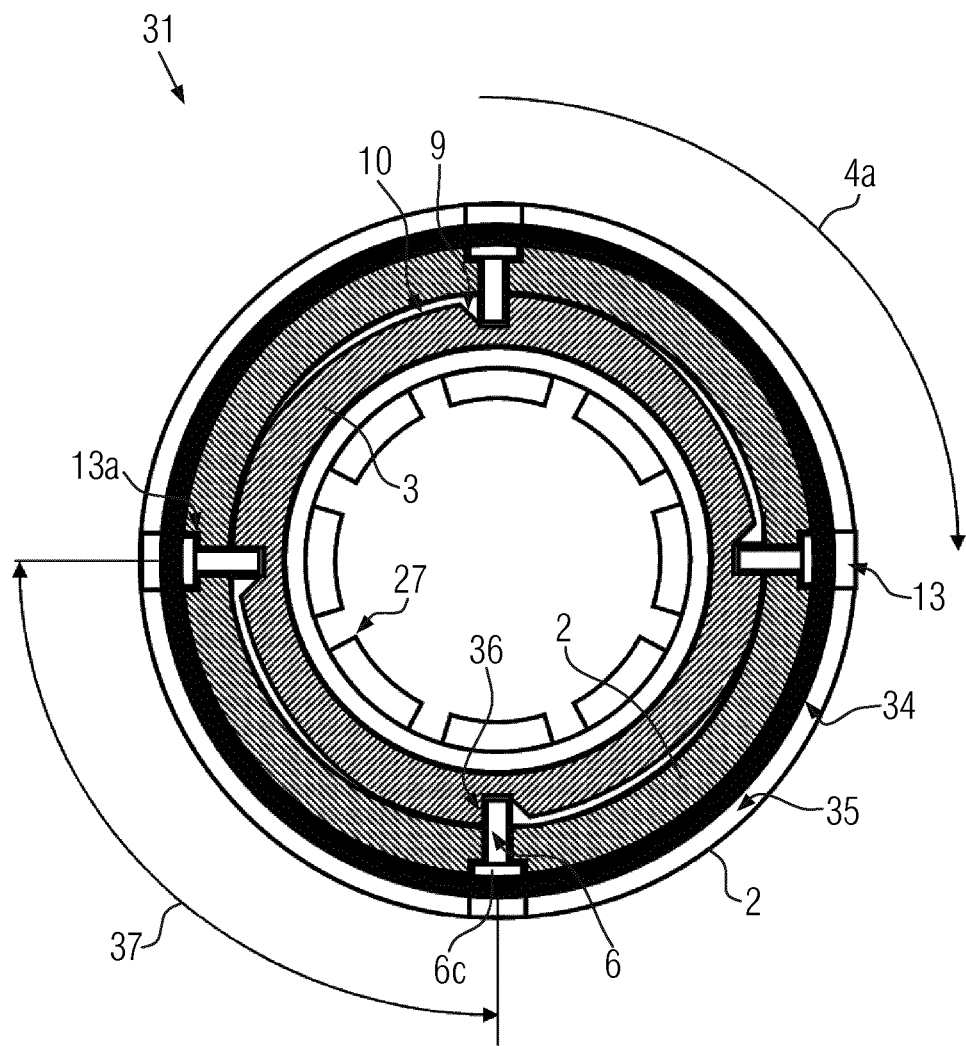
FIG. 6 shows a schematic cross-section with alternative resilient mounting of the locking pins.

FIG. 6 shows in cross-section from above a quick-change coupling 31 which differs from the above embodiment by a different resilient mounting of locking pins 6 in outer member 2. The preload can according thereto be effected by a resilient ring 34, for example, by an O-ring, which envelops bores 13 seated in a circumferentially extending groove 35 and presses from the outside on locking pins 6 by way of expansion stress.

FIG. 6 shows locking pins 6 in the engaged position in associated engagement recesses 36 which, by way of example, but not necessarily, are configured as blind holes. Schematically indicated are also guide grooves 10 and second guide bevels 9 for locking pins 6. These elements are representative of a plurality of possible distribution patterns, by way of example in quadruple version at equal angular intervals 37 to each other Indicated schematically in inner member 3 is furthermore a cap insert 27 for clamping screw caps 22 in a rotationally fixed manner.

When twisting outer member 2 and inner member 3 against each other in a direction opposite to working direction of rotation 4a, locking pins 6 are pressed outwardly by second guide bevels 9 and guide grooves 10 in bores 13 against the resistance of elastic ring 34. Elastic ring 34 is in the region of bore 13 stretched outwardly but remains guided in circumferential groove 35.

Elastic ring 34 circumferentially enveloping locking pins 6 simultaneously causes the preload inwardly and prevents locking pins 6 from dropping outwardly.

The features of the embodiments of quick-change coupling 1, 31 described and illustrated can be combined and/or mutually exchanged. The number and the angular distribution of locking pins 6 and engagement recesses 8 can also be adapted to different applications and to torques 4 and axial contact pressure forces 5 that are respectively to be transmitted. Furthermore, axial tensile forces can basically also be transmitted with quick-change coupling 1, 31.

The invention claimed is:

1. A quick-change coupling for a container treatment machine, comprising:
   an outer member and an inner member engaging therewith in a positive locking manner between which the outer member and the inner member torque in a working direction of rotation and axial forces can be transmitted,
   wherein said outer member and said inner member are connected to each other by pushing one of the outer member and the inner member into the other of the outer member and the inner member and subsequently twisting,
   wherein said outer member comprises locking pins preloaded resiliently inwardly, and
   wherein said inner member comprises first guide bevels for said locking pins for forcing said locking pins outwardly when one of the outer member and the inner member is pushed into the other of the outer member and the inner member, and engagement recesses in which said locking pins can engage in a rotationally fixed and axially fixed manner during the subsequent twisting in the working direction of rotation,
   wherein, directly at the end of the twisting motion, the locking pins engage inwardly in the radial direction in the engagement recesses due to spring tension,
   wherein second guide bevels are formed on said engagement recesses for said locking pins for forcing said locking pins outwardly during the twisting in a direction opposite to said working direction of rotation and to guide them out from said engagement recesses.

2. The quick-change coupling according to claim 1, wherein guide grooves extending substantially circumferentially are formed for said locking pins between said first guide bevels and said second guide bevels.

3. The quick-change coupling according to claim 2, wherein said guide grooves have an axial inclination and/or an eccentric guide surface for said locking pins with a guide radius decreasing toward said engagement recesses.

4. The quick-change coupling according to claim 2, wherein said locking pins have a substantially flat and/or convexly curved face side and said guide grooves.

5. The quick-change coupling according to claim 1, wherein said first guide bevels extend transversely to said working direction of rotation and obliquely outwardly in a direction away from outer member.

6. The quick-change coupling according to claim 1, wherein said locking pins, said first guide bevels, and said engagement recesses are each formed at least three-fold in mutually corresponding circumferential distribution.

7. The quick-change coupling according to claim 1, wherein said outer member, for preloading said locking pins comprises compression springs associated with the locking pins and/or an elastic ring enveloping said locking pins.

8. The quick-change coupling according to claim 1, wherein stops are additionally formed on said outer member for said locking pins and limit a motion of said locking pins out from said outer member.

9. The quick-change coupling according to claim 1, wherein cleaning holes are formed on said outer member.

10. The quick-change coupling according to claim 1, wherein matching concentric mating surfaces are formed on said outer member and on said inner member.

11. The quick-change coupling according to claim 1, wherein said outer member comprises a drive connection for a lifting/rotating of a shaft.

12. The quick-change coupling according to claim 1, wherein said inner member is configured as an exchangeable holder for a tool insert or a container component.

13. A capping chuck for mounting screw caps on containers with a quick-change coupling according to claim 1.

14. A capping machine for containers, comprising a continuously rotatable container carousel and several of capping chucks revolving thereon according to claim 13.

15. The quick-change coupling according to claim 1, wherein the container treatment machine is a capping machine.

16. The quick-change coupling according to claim 4, wherein said locking pins have guide grooves comprising a guide cross-section corresponding thereto.

17. The quick-change coupling according to claim 5, wherein said first guide bevels extend orthogonally to said working direction of rotation.

18. The quick-change coupling according to claim 11, wherein the shaft is arranged thereabove the drive connection.

19. The quick-change coupling according to claim 12, wherein the exchangeable holder for the tool is a holder for a cap insert for screwing on caps.

* * * * *